United States Patent
Miller et al.

(10) Patent No.: US 8,706,393 B2
(45) Date of Patent: Apr. 22, 2014

(54) INTERSECTION COLLISION AVOIDANCE WITH ADAPTABLE VEHICLE DIMENSIONS

(75) Inventors: Alex Maurice Miller, Canton, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 13/346,743

(22) Filed: Jan. 10, 2012

(65) Prior Publication Data

US 2013/0179047 A1 Jul. 11, 2013

(51) Int. Cl.
*G06F 17/10* (2006.01)

(52) U.S. Cl.
USPC .......................................................... 701/301

(58) Field of Classification Search
USPC ............ 701/70, 400, 412, 527, 300, 301, 302
See application file for complete search history.

(56) References Cited

U.S. PATENT DOCUMENTS

| | | | |
|---|---|---|---|
| 7,124,027 B1 * | 10/2006 | Ernst et al. ................... | 701/301 |
| 2004/0181338 A1 * | 9/2004 | Dobler et al. ................ | 701/301 |
| 2011/0035150 A1 * | 2/2011 | Sundarraj et al. ............ | 701/301 |

\* cited by examiner

*Primary Examiner* — Kim T Nguyen
(74) *Attorney, Agent, or Firm* — Joseph E. Root

(57) ABSTRACT

A method for avoiding a collision between a host vehicle and a target vehicle defines the intersection of their trajectories as the potential collision zone. The method calculates the distance to be traversed and the time required for the target vehicle to reach the collision zone and to clear it. The method then incorporates the possible cases when the target vehicle may be towing a trailer, and uses an adjusted value for the length of the target vehicle for further calculations in such cases. Further, the deceleration required by the host vehicle to allow the target vehicle to pass safely under a 'brake to pass' condition is calculated. The method then evaluates a break threat number based on this deceleration value and provides warning signals to the occupant of the host vehicle, to apply the brakes immediately or after a certain time, based on the break threat number value.

16 Claims, 3 Drawing Sheets

INTERSECTION COLLISION AVOIDANCE WITH ADAPTABLE VEHICLE DIMENSIONS

BACKGROUND

Collision control/avoidance systems and methods have been widely used in the art to avoid collisions between two vehicles. Specifically, host vehicles are equipped with a number of sensors disposed at different locations, and these sensors generally detect the presence of vehicles proximal to the host vehicle, and specifically those vehicles that may pose potential collision threats. Many collision avoidance/detection systems are based on determining the accurate relative positions of the host vehicle and the vehicle posing the collision threat, and predicting their trajectories. The positional coordinates of the host vehicle and the target vehicle are generally determined through vehicle-to-vehicle communication systems (V2V), or radar or vision based systems provided in the host vehicle. Signals for a forward collision warning are then provided to the host vehicle's occupant.

Many of these conventional systems use methods that at times do not take into account the length of the target vehicle being considered, when determining the likelihood of collision threats and when calculating the deceleration required by the host vehicle to avoid collision. For instance, there may be cases when the vehicle posing collision threat may be towing another object, or is being towed by another vehicle. In such cases, the target vehicle's actual dimensions used for the collision threat assessment may be invalid. When projecting the trajectories of the host vehicle and target vehicle, an important concern for such collision threats assessments is determining when the target vehicle would leave the potential collision zone, and this determination goes wrong when the actual dimensions for the host and the target vehicle are not used.

Consequently, there exists a need for a collision threat assessment method that may work well with adaptable vehicle dimensions, and especially in cases where the vehicle posing collision threat may be towing another vehicle.

SUMMARY

The present disclosure describes a method for assessing a collision threat between a target vehicle and a host vehicle. The method is compatible with adaptable vehicle dimensions, and uses the actual length of the target vehicle in calculations when assessing the threat, and incorporates cases where the target vehicle may be towing an object.

In one aspect, this disclosure provides a method to avoid a collision between a host vehicle and a target vehicle. The method includes locating current positions of the host vehicle and the target vehicle and defining a potential collision zone by projecting their current trajectories forward and identifying the intersection of the trajectories. The method assumes a value for the length of the target vehicle along its direction of motion, and determines whether it is correct. If incorrect, it adjusts the assumed length. It is then checked whether the target vehicle currently intercepts the host vehicle's path, and the position of the host vehicle is calculated at the instant when the target vehicle is expected to reach the potential collision zone. The method then calculates a speed change value required by the host vehicle to avoid a collision with the target vehicle, based on the adjusted assumed vehicle lengths. The method then provides signals to the host vehicle effect the host vehicle speed change In one embodiment, the method further calculates the deceleration value required by the host vehicle to allow the target vehicle to pass safely and avoid the collision. A brake threat number is then calculated based on this deceleration value, and signals are provided to the host vehicle based on the value of the break threat number.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description elucidates aspects of the disclosure and the ways it can be implemented. However, the description does not define or limit the invention, such definition or limitation being solely contained in the claims appended thereto. Although the best mode of carrying out the invention has been disclosed, those in the art would recognize that other embodiments for carrying out or practicing the invention are also possible.

The present disclosure pertains to a Brake-to-Pass collision threat assessment algorithm that works effectively with adaptable vehicle dimensions. Similar methods can be used to augment an Accelerate-to-Pass threat algorithm. For the purpose of better comprehension of the disclosure, the following terms carry the indicated meanings/definitions:

Longitudinal direction: Refers to a direction substantially parallel to the direction of motion of a host vehicle.

Lateral direction: Refers to a direction substantially perpendicular to the longitudinal direction.

Target vehicle: Any vehicle posing a potential collision threat to the host vehicle. For posing the threat, the target vehicle must have at least a component of its velocity along the lateral direction. Else, the collision would not occur.

Potential collision zone: The region where a collision between the host vehicle and the target vehicle would occur, in case if the host vehicle and the target vehicle continue moving along their current trajectories.

Further, the target vehicle and the host vehicle are assumed to move either with constant velocities or uniform accelerations for calculations performed by the method of the present disclosure.

Figure 1:
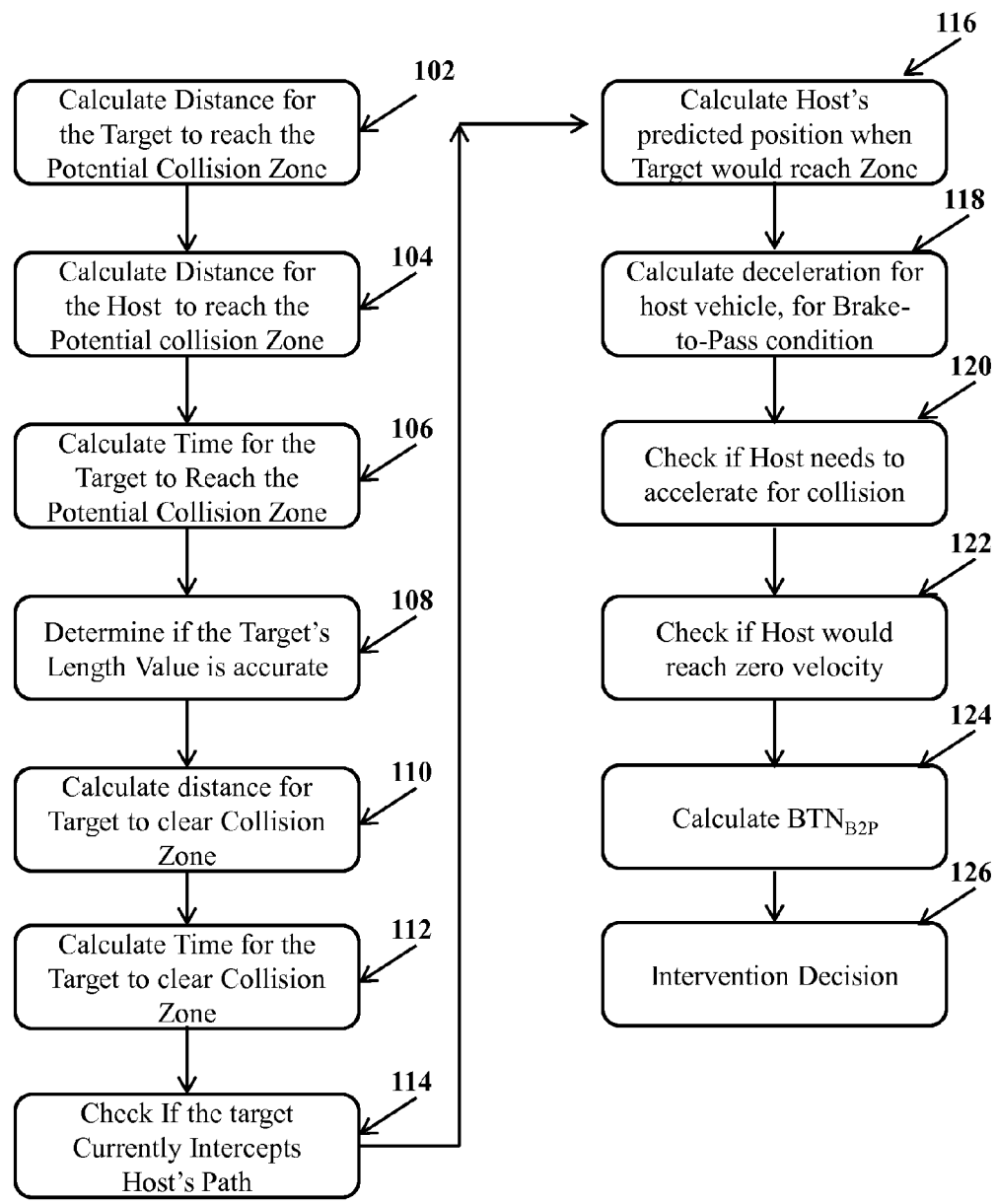
FIG. 1 is a flow chart showing the different steps involved in collision threat assessment and avoiding the collision between a host vehicle and a target vehicle, in accordance with the present disclosure.
Figure 2:
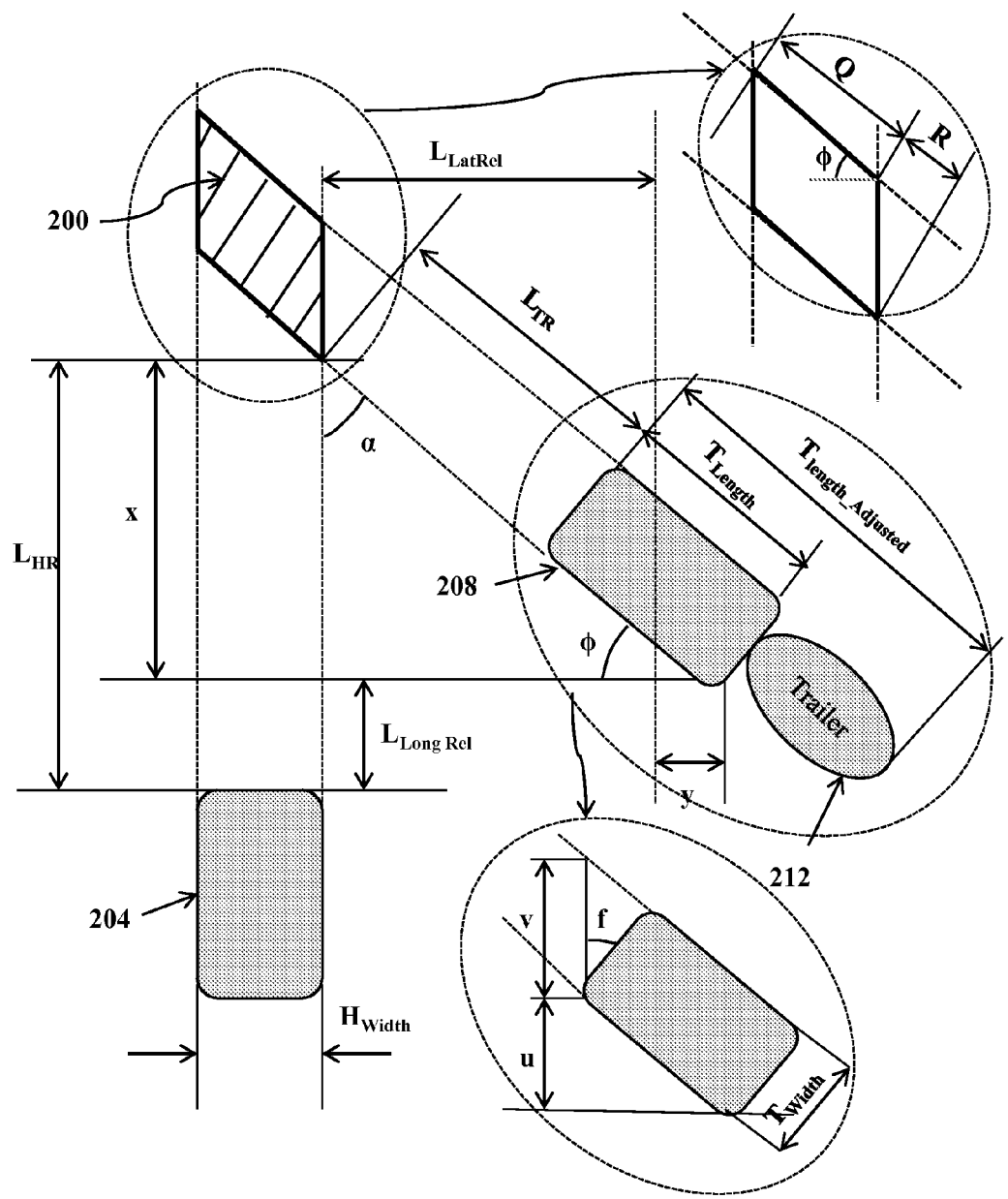
FIG. 2 illustrates the case when the target vehicle and the host vehicle move along oblique trajectories, and the different measurements and reference lines used by the collision threat assessment method of the present disclosure.

FIG. 1 shows the steps involved in the method 100 for estimating a potential collision threat between a host vehicle 204 and a target vehicle 208, and for calculating a Break Threat Number (BTN) to allow the host vehicle to apply brakes at a specific time, and letting the target vehicle pass safely. FIG. 2 shows the projected territories of the host vehicle 204 and the target vehicle 208, the potential collision zone 200 and the different relevant measurements and reference lines used for executing the method disclosed in FIG. 1. For simplicity and economy of expression, the potential collision zone 200, as shown in FIG. 2, would be referred to as 'Zone 200', host vehicle 204 would be referred to as 'host 204' and target vehicle 208 would be referred to as 'target 208' hereinafter.

Explaining method 100 of FIG. 1, in conjunction with FIG. 2, at step 102, the distance to be traversed by target 208 from its current position, to reach zone 200, is calculated. This is represented by $L_{TR}$. First, the potential collision zone 200 between the host vehicle and the target vehicle is defined. This is done by locating the current positions of host 204 and target 208, and projecting their trajectories forward along their directions of motion. The intersection of these projected trajectories defines the potential collision zone 200, as indicated by the shaded rhombus in FIG. 2. It is assumed that the host vehicle and the target vehicle would continue moving along their current directions of motion before entering zone 200. Now, the distance $L_{TR}$ is calculated mathematically as follows:

$$\Phi = 90 - \alpha$$

$$y = \tfrac{1}{2}(T_{Length} \cos \Phi - T_{width} \sin \Phi)$$

$$x = (L_{latRef} + y - (\tfrac{1}{2})H_{width}) \tan \Phi$$

$$L_{TR} = [x^2 + (L_{LatRef} + y - \tfrac{1}{2} H_{width})^2]^{1/2} - T_{Length} \quad (1)$$

Figure 3:
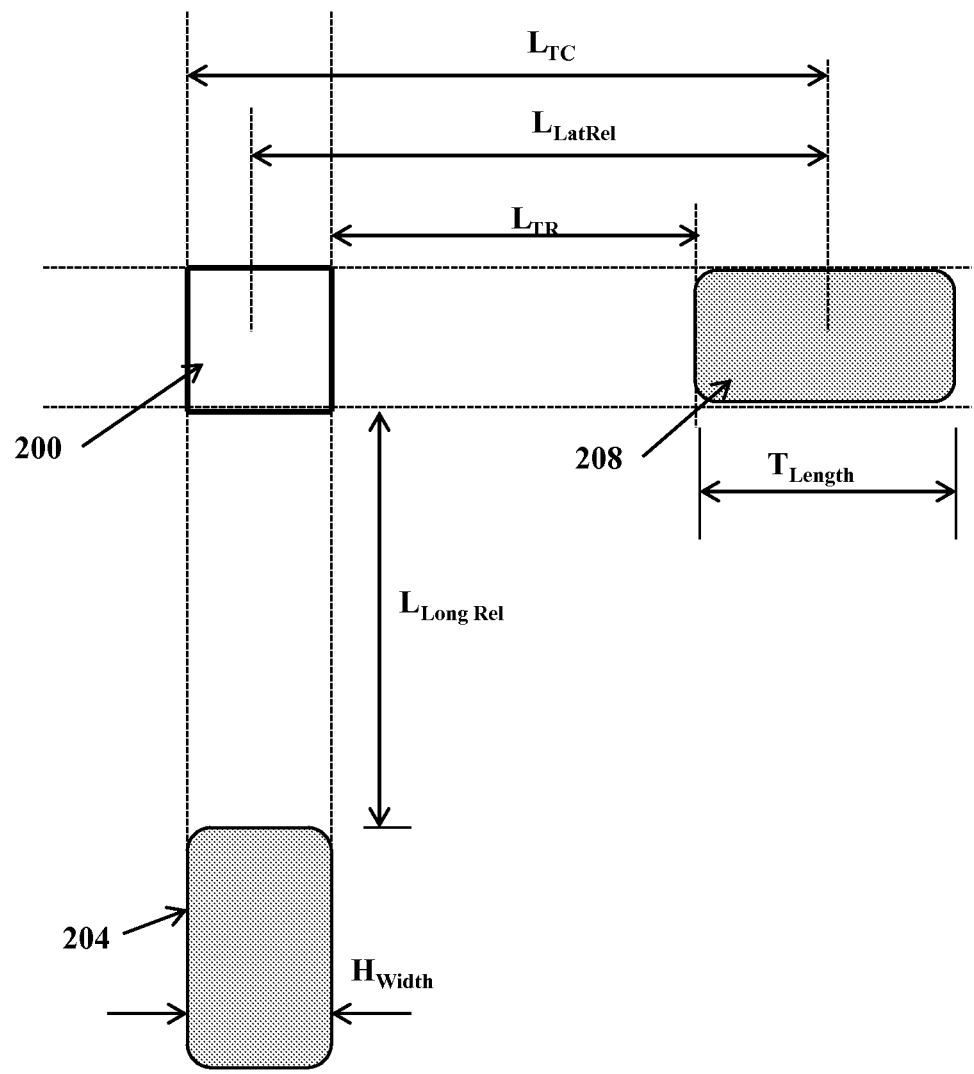
FIG. 3 illustrates the case when the target vehicle and the host vehicle have perpendicular trajectories.

For the case when the target vehicle is travelling perpendicular to the direction of motion of the host vehicle (i.e., along the lateral direction), $\phi=0$, as shown in FIG. 3, Eq. (1) reduces to:

$$L_{TR} = L_{LatRef} - \tfrac{1}{2}(H_{Width} + T_{Length}) \quad 1(a)$$

Where:
$\alpha$=Relative heading angle of the target vehicle measured with respect to the host vehicle's path
$\Phi$=Relative heading angle of the target vehicle measured with respect to a line perpendicular to the host vehicle's path, i.e., with respect to the lateral direction
$L_{Long\ Rel}$=Current longitudinal relative position of the front portion of the host vehicle with respect to the proximal side of the target vehicle
$L_{LatRel}$=Current lateral relative position of the center of the host vehicle with respect to the center of the target vehicle
x=The extra distance over $L_{Long\ Rel}$ that the host needs to travel to enter the collision zone due to the target vehicle's trajectory being inclined to the host vehicle's trajectory
y=Half of the lateral projection of the length of the target vehicle ($T_{Length}$), as measured on the plane perpendicular to the host vehicle's path of motion, i.e., the lateral plane
$T_{Length}$=Length of the target vehicle, construed along its direction of motion
$H_{Width}$=Width of the host vehicle, construed perpendicular to its direction of motion
$L_{TR}$=The distance that the target must travel to reach the collision zone At step 104 in FIG. 1, method 100 calculates the distance to be traversed by host 204 to reach the potential collision zone ($L_{HR}$). This is given by:

$$L_{HR} = L_{LongRef} + x \quad (2)$$

For the case when target 208 moves perpendicular to the host's path, $\phi=0$, and $$L_{HR} = L_{LongRel} \quad 2(a)$$

Value of 'x', calculated before, is used in Eq. (2) to calculated $L_{HR}$

At step 106, the method 100 calculates the time required by target 208 to reach zone 200. If the target 208 is moving with a constant velocity $V_{Target}$, then this time is given by using the first degree equation, as follows:

$$\text{Time}_{TR} = -(L_{TR}/V_{Target}) \quad 3(a)$$

Else, if target 208 moves with a uniform acceleration, then using the $2^{nd}$ equation of motion, we have:

$$0.5 A_{Target} T^2_{TR} + V_{Target} T_{TR} + L_{TR} = 0$$

And hence, $$\text{Time}_{TR} = [-V_{Target} +/- [V^2_{Target} - 2 A_{Target} L_{TR}]^{1/2}]/A_{Target} \quad 3(b)$$

Where, $A_{Target}$=Acceleration of the target vehicle, and
$V_{Target}$=Initial velocity of the target vehicle, at its current position, and
$T_{TR}$=Time required by the target vehicle to reach the potential collision zone In case if Eq 3 (a) or Eq. 3 (b), whichever is applicable, does not have a positive solution, then the paths of the target vehicle and the host vehicle would not intersect and the collision would not occur. This corresponds to the case when the host and target vehicles may be travelling along parallel paths, or when the target vehicle is moving away from the host vehicle.

At step 108, method 100 determines whether the length of the target vehicle 208 ($L_{TR}$) to be used for further calculations, is accurate. This check is performed to incorporate cases when target 208 may be towing another vehicle, for example. Any suitable way can be used for this check, including using a vehicle to vehicle (V2V) communication system, where the target 208 may be equipped with some on-board diagnostics to determine whether it is towing something. This may further be based on using a smart towing system commonly known in the art, which may produce signals if something is being hooked to the target vehicle's tow hitch. Further, a vision-based system may collaborate with the V2V system, and the case of towing can be identified by comparing the two estimates of the length of the target vehicle obtained from the V2V system and the vision-based system. In the case where the target 208 is not towing any object, the method 100 uses the actual length of target 208 ($T_{Length}$) for further calculations. Else, in case of towing, method 100 uses an adjusted length for target 208, which is given by:

$$T_{Length\_Adjusted} = T_{Length} + T_{Towed} \quad (4)$$

Where:
$T_{Towed}$=Length of the Towed object/Vehicle
In certain cases, an approximate value of $T_{Towed}$ can be used by the knowledge of the heaviest object's dimensions that the target vehicle is rated to tow.

At step 110, the method 100 calculates the distance to be traversed by target 208 to clear zone 200, from its current position. As illustrated in FIG. 2, we have:

$$L_{TC} = L_{TR} + T_{length} + Q + R \quad (5)$$

where:

$$Q = H_{width}/\cos \Phi \quad (6)$$

$$R = T_{Width} \tan \Phi \quad (7)$$

When the target vehicle travels perpendicular to the path of the host vehicle, i.e., if $\phi=0$, we have:

$$L_{TC} = L_{LatRef} + \tfrac{1}{2}(H_{Width} + T_{Length}) \quad 5(a)$$

$L_{TC}$=Distance to be traversed by target 208 to clear zone 200. In the case where the target 208 tows an object 212, the length of the object 212 ($T_{Towed}$) has to be taken into account for calculating $L_{TC}$. This is done by using the adjusted value for target's length from Eq (4). In that case:

$$L_{TC} = L_{TR} + T_{Length\_Adjusted} + Q + R \quad 5(b)$$

The values of $L_{TR}$, Q & R would remain same though. $L_{TR}$ has been already calculated and its value can be used from Eq. (1) or Eq. 1 (a), as the case may be, and substituted in either Eq. (5), Eq. 5 (a) or Eq. 5 (b), to calculate $L_{TC}$.

At step 112, method 100 calculates the time required for target 208 to clear zone 200, from its current position. In the case where the target 208 moves with a constant velocity (i.e., no acceleration), the first degree equation is used to obtain this time as:

$$\text{Time}_{TC} = -[L_{TC}/V_{Target}] \quad \quad 8(a)$$

Else, if target 208 moves with uniform acceleration denoted by $A_{target}$, then the second equation of motion is used to calculate the time as follows:

$$0.5\, A_{Target} T^2_{TC} + V_{Target} T_{TC} + L_{TC} = 0;$$

Solving the quadratic equation;

$$\text{Time}_{TC} = [-V_{Target} +/- [V^2_{Target} - 2A_{Target} L_{TC}]^{1/2}]/A_{Target} \quad 8(b)$$

where, $\text{Time}_{TC}$ ($T_{TC}$)=time required by target 208 to clear zone 200

At step 114, method 100 checks whether target 208 currently intercepts the path of host 204. Specifically, the signs of $L_{TR}$ and $L_{TC}$ are compared through their values obtained from Eq (1) and Eq. (5), and if these values carry opposite signs, it means that the target 208 has reached zone 200 but has not yet cleared it. This infers that target 208 is currently intercepting the host vehicle's path.

Next, at step 116, method 100 predicts the position of host 204 at the time when target 208 is expected to reach zone 200. For this, first the projected length of the target 208 over the host vehicle's path is taken into account. As shown in FIG. 2, this projected length is given by u+v, where:

$$u = T_{Length}\, \text{Sin}\, \phi$$

$$v = T_{Width}/\text{Cos}\, \phi$$

Next, $L_{LongRelMod} = u + v + H_{Length} + L_{LongRel}$
For the case when the target 208 travels perpendicular to the path of the host 204, i.e., $\phi = 0$, we have:

$$L_{LongRelMod} = T_{Width} + H_{Length} + L_{LongRel}$$

where:
$L_{LongRelMod}$ is the longitudinal relative position of the rear portion of host 204 with respect to the distal side of target 208, and
$L_{LongRel}$ is the longitudinal relative position of the front portion of host 204 with respect to the proximal side of the target 208

Then, the longitudinal relative position of the rear portion of host 204 with respect to the distal side of target 208 is calculated at the time when target 208 is predicted to enter zone 200. This is obtained using the second-degree equation of motion as follows:

$$L_{LongRel@TimeTR} = L_{LongRelMod} + V_{LongRel}\text{Time}_{TR} + \tfrac{1}{2} A_{LongRel}\text{Time}^2_{TR} \quad (9)$$

Where, $V_{longRel}$=Current relative velocity of host 204 along the longitudinal direction. If $L_{Long\,Rel@TimeTR}$ is found to be negative, then it means that host 204 would pass zone 200 before target 208 reaches there, and the collision would not occur. If $L_{Long\,Rel@TimeTR}$ is positive, it means that host 204 needs to apply brakes to achieve a deceleration to allow target 208 vehicle to pass safely. This is referred to as 'brake-to-pass' condition.

At step 118, the method 100 calculates the deceleration needed by the host 204 to allow the target 208 to pass safely, in the brake to pass condition. This is done by first calculating the position of the front portion of the host 204 with respect to the proximal side of the target 208, at the time when the target 208 is expected to clear zone 200 (i.e., $\text{Time}_{TC}$). Using second equation of motion:

$$L_{LongRel@TimeTC} = L_{LongRel} + V_{LongRel}\text{Time}_{TC} + \tfrac{1}{2} A_{LongRel}\text{Time}^2_{TC} \quad (9)$$

where:
$L_{Long\,Rel@TimeTC}$=Longitudinal relative position of the front portion of the host 204 with respect to the proximal side of the target 208, at the time when the target 208 is expected to clear zone 200, and
$V_{long\,Rel}$=Current relative velocity of the host 204 along the longitudinal direction.
$\text{Time}_{TC}$ has been already calculated before and its value can be used either from Eq 8 (a) or Eq 8 (b) obtained earlier, and substituted in Eq. (9) to get $L_{Long\,Rel@TimeTC}$.
Then, assuming that the host 204 applies brakes immediately, the amount of deceleration required to avoid collision and to allow the target 208 to pass safely, is given by applying the second equation of motion as follows:

$$A_{LongRequiredCrossingB2P} = 2L_{LongRel@TimeTC}/[\text{Time}^2_{TC}] \quad (10)$$

Where:
$A_{LongRequiredCrossingB2P}$=Deceleration along the longitudinal direction required by the host 204 to allow the target 208 to pass safely, in brake to pass condition.

At step 120, method 100 checks whether the host 204 will have to accelerate to hit the target 208. This is done by checking the sign of the acceleration $A_{LongRequiredCrossingB2P}$ required for brake to pass condition, as obtained in Eq (10) above. If $A_{LongRequiredCrossingB2P} > 0$, then the host 204 will need to accelerate in the longitudinal direction for the collision, and thus, the collision will not occur.

At step 122, method 100 checks whether the host 204 will reach a zero relative velocity component along longitudinal direction before the target 208 is expected to clear zone 200. If it will, then the collision would not occur. If the host 204 has a current deceleration value along the longitudinal direction of $A_{Long\,Rel}$, and a current relative longitudinal velocity of $V_{Long\,Re}$, then using the first degree equation of motion, the time taken by the host 204 to reach a zero longitudinal velocity with this value of acceleration is given by:

$$T_{ToVLongRel=0} = V_{LongRel}/A_{LongRel} \quad (11)$$

If $T_{ToVLongRel=0} > \text{Time}_{TC}$, then the longitudinal relative velocity component of the host 204 will become zero before the target 208 crosses zone 200, and the collision would not occur.

At step 124, method 100 calculates a brake threat number (BTN) for the brake-to-pass condition. The brake threat number is given by:

$$BTN_{BTP} = A_{LongRequiredCrossingBTP}/A_{HostLongMax} \quad (12)$$

Where:
$A_{LongRequiredCrossingBTP}$=The deceleration required by host 204 for brake-to-pass condition
$A_{HostLongMax}$=Maximum acceleration/deceleration that the host vehicle can achieve, and
$BTN_{BTP}$=The break threat number required for brake-to-pass condition.

At step 126, based on the value of break threat number obtained from Eq. (12) above, an intervention decision is made. The intervention decision corresponds to warning signals that are provided to the occupant of the host vehicle 204. For BTN=1, it means that the host 204 needs to immediately apply brakes at its current position, to just allow the target 208 to pass safely through zone 200. Practically, there is some reaction time associated with the driver when he receives these signals, and the delay in instantaneous application of brakes is taken into account while calculating the break threat number. In one aspect, a certain threshold value of $BTN_{BTP}$ can be set, and when the actual value of BTN reaches that threshold level, a warning signal is provided to the occupant of host 204 to apply brakes instantaneously.

The disclosed method 100 for calculating the break threat number and avoiding collisions between the target vehicle and the host vehicle can be used with vehicles of any type and dimensions, including cars, trucks, trailers etc. Further, calculation of the break threat number to provide warning signals to the target vehicle is mandatory for cases when the host and the target vehicle have intersecting trajectories when projected further, and there is a definite chance of a prospective collision.

Although the current invention has been described comprehensively, in considerable details to cover the possible aspects and embodiments, those skilled in the art would recognize that other versions of the invention may also be possible.

What is claimed is:

1. A method for avoiding collision between a host vehicle and a target vehicle, wherein the host vehicle is equipped with a collision avoidance system, including one or more sensors for detecting the presence of nearby vehicles and calculating means for processing signals from the sensors, the method comprising:
    locating current positions of the host vehicle and the target vehicle, employing the one or more sensors;
    defining a potential collision zone, employing the calculating means, including assuming target and host vehicle lengths,
    determining whether the assumed vehicle lengths are incorrect, and if incorrect, adjusting the assumed lengths;
    checking whether the target vehicle currently intercepts a host vehicle's path, taking into consideration the adjusted assumed lengths of the vehicles;
    predicting host vehicle's position at an instant when the target vehicle is expected to reach the potential collision zone;
    calculating a host vehicle speed change value required by the host vehicle to avoid a collision with the target vehicle, based on the adjusted assumed lengths; and
    providing signals from the collision avoidance system to a controller on the host vehicle to effect the host vehicle speed change.

2. The method of claim 1, wherein defining the potential collision zone includes projecting current trajectories of the host vehicle and the target vehicle forward along their respective directions of motion, and determining a intersection of the projected trajectories.

3. The method of claim 1, further comprising calculating, for the target vehicle, from its current position, a distance to be traversed and a time required to reach the potential collision zone.

4. The method of claim 3, further comprising, calculating, for the target vehicle, from its current position, the distance to be traversed and the time required to clear the potential collision zone.

5. The method of claim 1, further comprising calculating a distance to be traversed by the host vehicle from its current position, to reach the potential collision zone.

6. The method of claim 1, further comprising, adjusting the assumed lengths by adding the actual length of the host vehicle or the target vehicle, to the length of a towed object, if either the host vehicle or the target vehicle, respectively, tows the object.

7. The method of claim 1, wherein checking whether the target vehicle currently intercepts a host vehicle further comprises, comparing, for the target vehicle, a value corresponding to a distance to be traversed from its current position, to reach the potential collision zone, with a value corresponding to a distance to be traversed from its current position to clear the potential collision zone, and declaring the interception if the two values are of opposite signs.

8. The method of claim 1, further comprising determining host vehicle's position when the target vehicle is expected to enter the potential collision zone.

9. The method of claim 8, further comprising determining a current position of the host vehicle's front portion with respect to a proximal side of the target vehicle, the current position being determined along a longitudinal direction substantially parallel to the direction of motion of the host vehicle.

10. The method of claim 9, further comprising determining a current position of the host vehicle's rear portion with respect to a distal side of the target vehicle, the position being determined along the longitudinal direction.

11. The method of claim 8, further comprising calculating the distance between the rear portion of the host vehicle and a distal side of the target vehicle, at the time when the target vehicle is expected to reach the potential collision zone.

12. The method of claim 1, wherein calculating the host vehicle speed change value further comprises calculating the distance between a front portion of the host vehicle and a proximal side of the target vehicle, at a time when the target vehicle is expected to clear the potential collision zone.

13. The method of claim 1, further comprising calculating a break threat number value by dividing the host vehicle speed change value with a maximum deceleration value that the host vehicle can achieve.

14. The method of claim 13, wherein if the break threat number's value is 1, then warming the host vehicle's occupant to apply brakes instantaneously to achieve a maximum deceleration.

15. The method of claim 13, further comprising, establishing a threshold value corresponding to the break threat number value, and providing warning signals to the host vehicle's occupant if the calculated break threat number value exceeds the threshold value.

16. The method of claim 1, further comprising, calculating a brake threat number value using the required host vehicle speed change value; and providing signals to the host vehicle based on the break threat number value.

* * * * *